No. 632,995. Patented Sept. 12, 1899.
B. E. FOSS.
SHAFT BEARING.
(Application filed Dec. 7, 1898.)
(No Model.)

WITNESSES:
Edward Thorpe
C. R. Ferguson

INVENTOR
B. E. Foss
BY
ATTORNEYS.

THE NORRIS PETERS CO., PHOTO-LITHO., WASHINGTON, D. C.

UNITED STATES PATENT OFFICE.

BYRON EFROM FOSS, OF CHICAGO, ILLINOIS, ASSIGNOR TO HIMSELF AND
FRANK K. RITTENHOUSE, OF SAME PLACE.

SHAFT-BEARING.

SPECIFICATION forming part of Letters Patent No. 632,995, dated September 12, 1899.

Application filed December 7, 1898. Serial No. 698,576. (No model.)

*To all whom it may concern:*

Be it known that I, BYRON EFROM FOSS, of Chicago, in the county of Cook and State of Illinois, have invented a new and Improved Shaft-Bearing, of which the following is a full, clear, and exact description.

This invention relates to improvements in bearings for shafts, and particularly to crank-shafts for bicycles or the like; and the object is to provide a bearing of simple construction that may be easily removed from or placed in its casing, hub, or hanger, as occasion may require, and, further, to so construct the device that it may be quickly and readily adjusted.

The invention consists of novel features and parts and combinations of the same, as will be fully described hereinafter and then pointed out in the claim.

Reference is to be had to the accompanying drawings, forming a part of this specification, in which similar characters of reference indicate corresponding parts in all the views.

Figure 1:
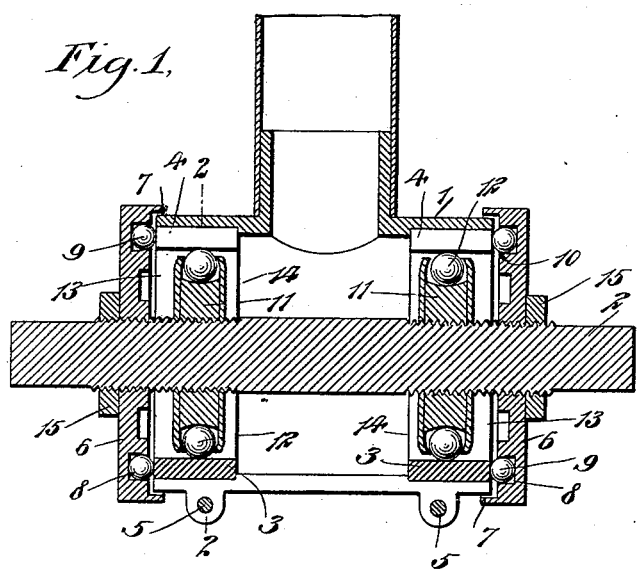
Figure 2:
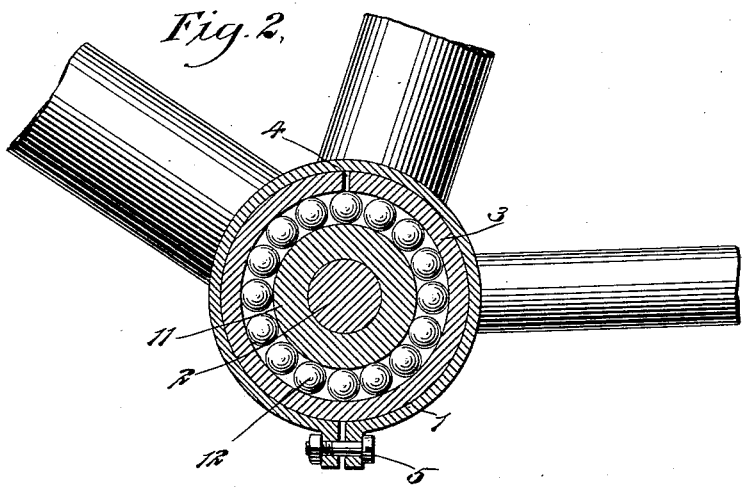
Figure 3:
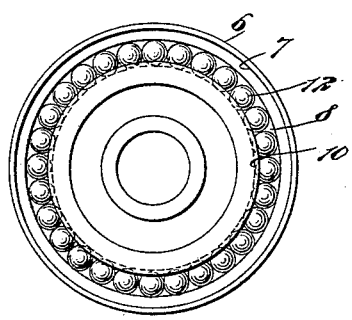

Figure 1 is a longitudinal section of a shaft-bearing embodying my invention. Fig. 2 is a section on the line 2 2 in Fig. 1. Fig. 3 is an inside view of one of the end caps employed.

Referring to the drawings, 1 designates a casing, hub, or hanger, which in this instance, however, is indicated as a hanger for a bicycle crank-shaft 2. Arranged within the ends of the casing, hub, or hanger are bearing-rings 3, and these bearing-rings are removably placed in the casing, hub, or hanger and are open, as at 4, so that they may be adjusted circumferentially by adjusting the casing, hub, or hanger 1 by means of bolts 5, said casing, hub, or hanger being longitudinally split or open at one side.

Having screw-thread engagement with the shaft 2 at each end of the casing, hub, or hanger is an end cap 6, which has an annular flange 7, designed to engage over the casing, hub, or hanger to prevent the entrance of dirt or dust. On the inner side and near the periphery each cap 6 has an annular channel 8, forming a raceway for bearing-balls 9, which engage against the outer ends of the rings 3 to hold the bearing-balls 9 in the raceway and to prevent their possible loss should it be desired to remove an end cap. I have shown one of the walls of the raceway (here shown as the inner wall 10) as swaged outward to engage against the bearing-balls at a point beyond their center. In other words, by swaging this wall outward, as shown, the space between it and the opposite or outer wall is somewhat less than the diameter of the balls. In placing the balls in the raceway the cap is to be placed flat upon a support and the balls are forced in by downward pressure, as I find that the swaged portion will yield sufficiently to allow the balls to pass. It is obvious, however, that the wall may be swaged after placing the balls in the raceway.

Having screw-thread engagement with the shaft 2 in line with the rings 3 are inner bearing-rings 11 for the balls 12, which also bear against the rings 3. The balls 12 are held in place by means of collars 13 and 14, having screw-thread engagement with the shaft 2 at opposite sides of the rings 11. The inner or adjacent faces of opposite collars 13 and 14 are dished inward at the periphery, so that the space between them is slightly less than the diameter of the balls, and thus the balls will be held from dropping out should the parts be separated from the casing, hub, or hanger.

The caps 6 may be held from rotation relatively to the shaft by means of jam-nuts 15, screwed on said shaft and engaging against the outer side of the caps.

When the bearing is used as a bicycle-crank-shaft bearing, it is obvious that the parts connected directly to the shaft will rotate said shaft relatively to the hanger; but in the event of the device being used for a wheel it is obvious that the casing or hub should rotate relatively to the shaft and the parts carried thereby.

Should it be desired to separate the several parts for the purpose of cleaning or otherwise, it is only necessary to remove one of the end caps 6, when the shaft, with the parts 11, 13, and 14 and the bearing-balls 12, may be moved outward.

Obviously the balls 10 will receive the side thrust of the bearing and the balls 12 will support the device vertically. By tightening the bolts 5 the rings 3 may be caused to bear more or less tightly against the balls 12.

Having thus fully described my invention, I claim as new and desire to secure by Letters Patent—

The combination with a shaft, of a casing longitudinally open at one side, bolts for adjusting the diameter of the casing, bearing-rings normally seated in the ends of the casing and longitudinally open at one side, bearing-collars on the shaft, retaining-collars on opposite sides of the bearing-collars and having their edges turned inward, the said retaining-collars forming side walls of raceways, balls in said raceways, end caps for the casing and having raceways, one wall of each of said raceways having its edge turned toward the other wall, and balls in said raceways, substantially as specified.

BYRON EFROM FOSS.

Witnesses:
WILLIAM E. KAMPMAN,
MYRA H. CODDING.